(12) United States Patent
Crimmins et al.

(10) Patent No.: US 11,243,091 B2
(45) Date of Patent: Feb. 8, 2022

(54) SELECTIVELY GENERATING DIRECTIONS BASED ON DEVICE LOCATION

(71) Applicant: International Business Machines Corporation, Armonk, NY (US)

(72) Inventors: Andrew G. Crimmins, Montrose, NY (US); Pasquale A. Catalano, Wallkill, NY (US); John S. Werner, Fishkill, NY (US); Arkadiy O. Tsfasman, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 16/211,146

(22) Filed: Dec. 5, 2018

(65) Prior Publication Data

US 2020/0182649 A1   Jun. 11, 2020

(51) Int. Cl.
*G01C 21/36* (2006.01)
*G06F 16/23* (2019.01)
*G06F 16/909* (2019.01)

(52) U.S. Cl.
CPC ..... *G01C 21/3641* (2013.01); *G01C 21/3629* (2013.01); *G01C 21/3644* (2013.01); *G06F 16/2379* (2019.01); *G06F 16/909* (2019.01)

(58) Field of Classification Search
CPC ............ G01C 21/3641; G01C 21/3644; G01C 21/3629; G01C 21/3484; G06F 16/2379; G06F 16/909; G06F 16/29
See application file for complete search history.

(56) References Cited

U.S. PATENT DOCUMENTS

| 5,808,565 A | 9/1998 | Matta et al. |
| 7,512,487 B1 * | 3/2009 | Golding ............ G01C 21/3492 701/424 |
| 7,755,472 B2 | 7/2010 | Grossman |

(Continued)

FOREIGN PATENT DOCUMENTS

CA    2163215 C    11/2009

OTHER PUBLICATIONS

Physics.org, "How does GPS work?" IOP Institute of Physics, 2 pages, retrieved on Dec. 5, 2018 from http://www.physics.org/article-questions.asp?id=55.

(Continued)

*Primary Examiner* — Sze-Hon Kong
(74) *Attorney, Agent, or Firm* — Zilka-Kotab, P.C.

(57) ABSTRACT

A computer-implemented method includes initializing a navigation application on a device, determining a current location of the device, and receiving a destination. The method also includes determining whether a known geographical feature is located on a travel path to the destination. The known geographical feature may be derived from a user profile. The method, in response to determining that a known geographical feature is not located on the travel path to the destination, includes outputting graphical and audio directions to the destination. In response to determining that a known geographical feature is located on the travel path to the destination, a sub-method includes determining whether the device is currently in a known area and outputting graphical and audio directions to the known geographical feature in response to determining that the device is not currently in the known area.

20 Claims, 4 Drawing Sheets

(56) References Cited

U.S. PATENT DOCUMENTS

| | | | |
|---|---|---|---|
| 9,347,780 B2 | 5/2016 | Caine et al. | |
| 9,587,955 B1* | 3/2017 | Boss | G01C 21/3629 |
| 9,644,983 B2* | 5/2017 | Kandangath | G01C 21/3629 |
| 9,778,054 B2 | 10/2017 | Rovik et al. | |
| 9,803,992 B2 | 10/2017 | Meredith et al. | |
| 9,909,895 B2 | 3/2018 | Boss et al. | |
| 9,945,684 B2 | 4/2018 | Bhatt et al. | |
| 10,215,582 B1* | 2/2019 | Goyal | G08G 1/096861 |
| 2003/0036842 A1* | 2/2003 | Hancock | H04L 67/02 |
| | | | 701/532 |
| 2003/0229444 A1* | 12/2003 | Bullock | G08G 1/096838 |
| | | | 701/420 |
| 2010/0324816 A1* | 12/2010 | Highstrom | G01C 21/367 |
| | | | 701/533 |
| 2011/0238289 A1* | 9/2011 | Lehmann | G01C 21/3617 |
| | | | 701/533 |
| 2015/0100231 A1* | 4/2015 | Weir | G08G 1/096872 |
| | | | 701/400 |
| 2015/0106012 A1* | 4/2015 | Kandangath | G01C 21/3629 |
| | | | 701/428 |
| 2015/0323341 A1* | 11/2015 | Farrell | G01C 21/3611 |
| | | | 701/426 |
| 2015/0345977 A1* | 12/2015 | Saito | B60L 3/00 |
| | | | 701/521 |
| 2016/0057569 A1* | 2/2016 | Soto Matamala | H04W 40/242 |
| | | | 455/456.3 |
| 2016/0076903 A1* | 3/2016 | Diaz | G01C 21/3415 |
| | | | 701/468 |
| 2017/0122758 A1* | 5/2017 | Rovik | G01S 19/42 |
| 2017/0122765 A1* | 5/2017 | Boss | G01C 21/3629 |
| 2017/0234690 A1* | 8/2017 | Kandangath | G01C 21/3641 |
| | | | 701/428 |
| 2018/0003518 A1 | 1/2018 | Hoareau et al. | |
| 2018/0066952 A1* | 3/2018 | Bansal | G01C 21/3484 |
| 2018/0347996 A1* | 12/2018 | Coleman | G06F 16/9537 |
| 2019/0143831 A1* | 5/2019 | Birek | B60L 3/12 |
| | | | 701/22 |
| 2019/0226864 A1* | 7/2019 | Miyazaki | G01C 21/3484 |
| 2019/0376798 A1* | 12/2019 | Abramson | G01C 21/3415 |
| 2020/0132501 A1* | 4/2020 | Czarnecki | G01C 21/3476 |
| 2020/0141756 A1* | 5/2020 | Chipouras | G01C 21/3641 |

OTHER PUBLICATIONS

Bertagna, P., "How does a GPS tracking system work?" EE Times, Oct. 26, 2010, 7 pages, retrieved from https://www.eetimes.com/document.asp?doc_id=1278363.

GPS.org, "Other Global Navigation Satellite Systems (GNSS)," GPS.gov, 2017, 2 pages, retrieved from https://www.gps.gov/systems/gnss/.

* cited by examiner

SELECTIVELY GENERATING DIRECTIONS BASED ON DEVICE LOCATION

BACKGROUND

The present invention relates to navigation and more specifically, this invention relates to cognitive route learning and generation of navigational directions based on device location.

There are a variety of navigational systems which are used to provide directions to users. The Global Positioning System (GPS) is a particularly prevalent technique for providing navigational directions. GPS directions originate from a network of satellites orbiting the Earth at an altitude of approximately 20,000 km. Any device with GPS capabilities may receive radio signals broadcast by the satellites. The GPS device calculates a location based on the amount of time the radio signals take to reach the receiver within the device.

Other navigational systems including the Wide Area Augmentation System (WAAS), the Local Area Augmentation System (LAAS), the Ground-Based Augmentation System (GBAS), GPS Aided Geo Augmented Navigation (GAGAN), the European Geostationary Navigation Overlay Service (EGNOS), Globalnaya Navigazionnaya Sputnikovaya Sistema (GLONASS), the Indian Regional Navigation Satellite System (IRNSS), the Navigation Indian Constellation (NavIC), the Quasi-Zenith Satellite System (QZSS), the Multi-functional Satellite Augmentation System (MSAS), the BeiDou Navigation Satellite System (BDS), Galileo, Starfire, OmniSTAR, and any other Global Navigation Satellite System (GNSS) (e.g. satellite-based augmentation system (SBAS)), are capable of providing navigational directions to a properly equipped device. Other radio navigation systems which are not satellite-based may be used to provide an appropriately equipped device with navigational directions such as long-range navigation (LO-RAN), Gee, Omega, Alpha, and Chayka, etc.

A user may need navigational directions to get to a destination even if certain legs of the travel path are familiar. For example, a user is typically very familiar with the first few miles around their home and/or until they reach the highway, etc. A user may not know how to get to a certain town, but they may be familiar enough with the town once they get there to find their way to an end destination.

For any of these known portions of the travel path, turn-by-turn audio directions may be annoying, distracting, and/or dangerous. Audio directions are customarily configured to interrupt any other audio output such as music, audio books, podcasts, phone conversations, etc. A conventional solution for bypassing interruptions includes manually disabling audio navigational directions and/or a navigation application outputting the audio directions. Manually disabling audio navigational directions and/or the navigation application typically includes a user physically interacting with a device while driving. Multi-tasking while driving is generally dangerous.

Disabling navigational directions and/or the navigation application may prevent the user from benefitting from other features of navigation applications. For example, a user may want to disable turn-by-turn audio directions but still receive alerts regarding traffic, accidents, stalled cars, construction areas, potholes, weather, ice, and other hazards on the road which are provided by various navigation applications.

SUMMARY

A computer-implemented method, according to one approach, includes initializing a navigation application on a device, determining a current location of the device, and receiving a destination. The method also includes determining whether a known geographical feature is located on a travel path to the destination. The known geographical feature may be derived from a user profile. The method, in response to determining that a known geographical feature is not located on the travel path to the destination, includes outputting graphical and audio directions to the destination. In response to determining that a known geographical feature is located on the travel path to the destination, a sub-method includes determining whether the device is currently in a known area. The method may include outputting graphical and audio directions to the known geographical feature in response to determining that the device is not currently in the known area. The method provides the benefit of outputting audio and graphical directions in response to determining that the device is in an unknown area.

The method may optionally include, in response to determining that a known geographical feature is located on the travel path to the destination, determining whether the device is currently in a known area, and outputting graphical directions to the known geographical feature in response to determining that the device is currently in the known area. The known area may be derived from the user profile. The method may include not outputting audio directions to the known geographical feature. The method provides the benefit of minimizing interruptions to audio outputs and distractions to the user when the device is in a known area.

A computer program product according to one approach is configured to perform the foregoing method.

A computer-implemented method, according to one approach, includes identifying a starting position of a device, identifying a travel path of the device, and identifying a destination of the device. The method also includes updating a user profile to reflect the starting position and destination, updating the user profile to reflect a date of arrival at the destination, updating a heat map associated with the user profile using information about the identified travel path, and updating the user profile to increment a number of trips to the destination. The method provides the benefit of building a user profile comprising a user's known area(s).

The method may optionally include updating the user profile to unmark the destination as known in response to a determination that the device has not traveled to the destination in a predetermined period of time after the destination was last visited and/or has not traveled to the destination at least a predetermined number of times in a second period of time preceding the updating. Updating the user profile to unmark the destination as known provides the benefit increasing the accuracy of known markings by considering a time-decay factor for a user's knowledge of a destination.

Other aspects and approaches of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for cognitive route learning and generating directions of various types depending on location.

In one general approach, a computer-implemented method includes initializing a navigation application on a device, determining a current location of the device, and receiving a destination. The method also includes determining whether a known geographical feature is located on a travel path to the destination. The known geographical feature may be derived from a user profile. The method, in response to determining that a known geographical feature is not located on the travel path to the destination, includes outputting graphical and audio directions to the destination. In response to determining that a known geographical feature is located on the travel path to the destination, a sub-method includes determining whether the device is currently in a known area and outputting graphical and audio directions to the known geographical feature in response to determining that the device is not currently in the known area.

In another general approach, a computer program product is configured to perform the foregoing method.

In another general approach, a computer-implemented method includes identifying a starting position of a device, identifying a travel path of the device, and identifying a destination of the device. The method also includes updating a user profile to reflect the starting position and destination, updating the user profile to reflect a date of arrival at the destination, updating a heat map associated with the user profile using information about the identified travel path, and updating the user profile to increment a number of trips to the destination.

Figure 1:
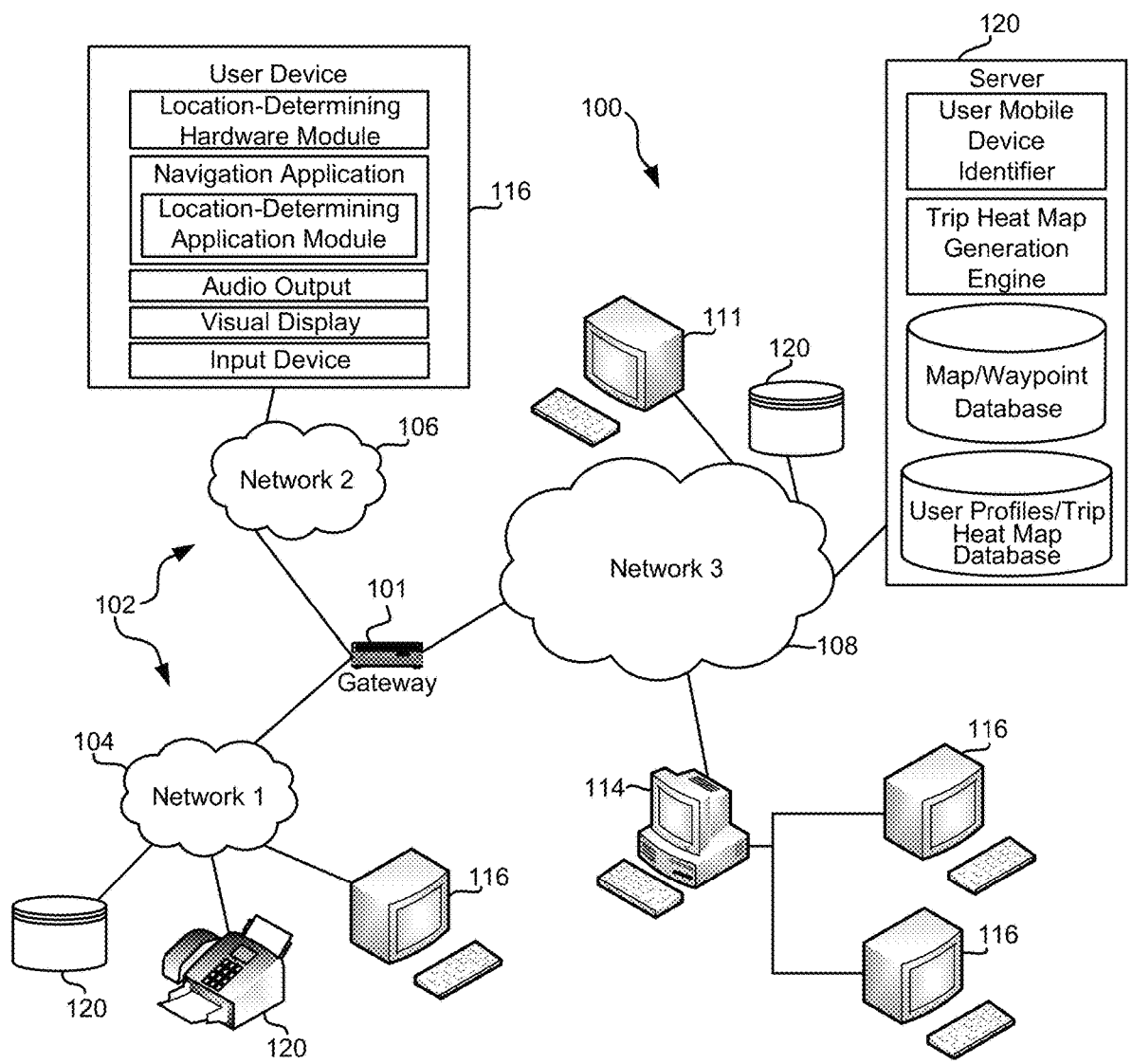
FIG. 1 illustrates a network architecture, in accordance with one approach.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

In one approach, a user device 116 may be a portable device such as a mobile device, a vehicle, a tablet, a vehicle-mounted GPS system, or any other user device with location-determining capabilities known in the art. The user device is described herein as using GPS in order to provide a context and aid the reader in understanding the various exemplary implementations. This has been done by way of example only, as the user device can be used with any type of positioning system and/or data, including those listed above. The positioning system and/or data derived therefrom may include, but is not limited to, the navigational systems listed above. Accordingly, other types of positioning-related components and/or functionality should be considered equivalents to the GPS-related components and/or functionality described herein.

In one approach, one or more GPS hardware modules may be implemented in the user device 116 to provide GPS capabilities. A GPS hardware module may comprise one or more receivers, a Global System for Mobile (GSM) module, an embedded accumulator, internal storage, etc.

In another approach, the user device 116 may comprise a navigation application for determining a waypoint and providing directions to the waypoint. The navigation application is referred to herein interchangeably as a "GPS application" in order to provide a context and aid the reader in understanding the various exemplary implementations. This has been done by way of example only, as the navigation application can be used with any type of positioning system and/or data, including those listed above, and thus such positioning systems and/or data should be considered equivalent thereto. The positioning system and/or data derived therefrom may include, but is not limited to, the navigational systems listed above.

In one approach, the navigation application is a stand-alone application. In another approach, any navigation application known in the art may be modified to include any combination of the novel features described herein. Exemplary navigation applications include Apple Maps, Google Maps, Waze, Glympse, Locale, Where, Topo Maps, CoPilot GPS, NeverLate, etc. In another approach, the navigation application comprises a module, e.g., a plugin, applet, etc., that functions with a known navigation application to enable any combination of the novel features described herein, such as allowing a user to set preferences for GPS audio directions based on at least some of the inventive approaches as described below in reference to FIGS. 3-4.

In one configuration, the user device 116 may comprise a combination of output and/or input components which are known in the art. The user device 116 may comprise any audio output component known in the art, such as a speaker. The user device 116 may comprise any visual display known in the art. The user device 116 may comprise any input component known in the art. In a preferred approach, the user device 116 comprises an input component which includes a touch screen, a microphone, etc.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

In one approach, a peripheral 120 may include a server. The server may comprise a unique user mobile device identifier. The user mobile device identifier may be associated with a mobile device, a vehicle, a tablet, a vehicle-mounted GPS system, or any other user device with location-determining capabilities known in the art. The user mobile device identifier may be any mobile identifier known in the art such as an International Mobile Equipment Identifier (IMEI), a Mobile Identification Number (MIN), a Mobile Subscription Identification Number (MSIN), a Subscriber Identification Module (SIM), an International Mobile Subscriber (IMSI), a device internet protocol (IP) address, a Mobile Subscriber Integrated Services Digital Network Number (MSISDN), a Vehicle Identification Number (VIN), etc.

The server may further comprise a trip heat map generation engine configured to generate a heat map as discussed in further detail below in reference to FIGS. 3-4. The trip heat map generation engine may be capable of using a device's historical trip data to generate a heat map of trips, roads, waypoints, etc. that a user is familiar with based on frequency of travel. A device's historical trip data may be stored in a user profile in any storage form known in the art. In one approach, the device's historical trip data is stored in a table in association with a specific user. User profile databases may comprise individual user information, individual device information, user device identifier(s), heat maps, historical trip data including starting positions, ending positions, travel paths, requests for GPS directions, travel times, travel dates, driver (e.g. user) habits such as average speed, average speed compared to a speed limit, etc. The generated heat maps and/or corresponding user profiles may be stored in a user profile database, a heatmap database, a user profile/heat map database, etc.

The server may comprise any GPS map/waypoint database which is known in the art including databases which may be built and/or updated by GPS applications, user input, social data, etc.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
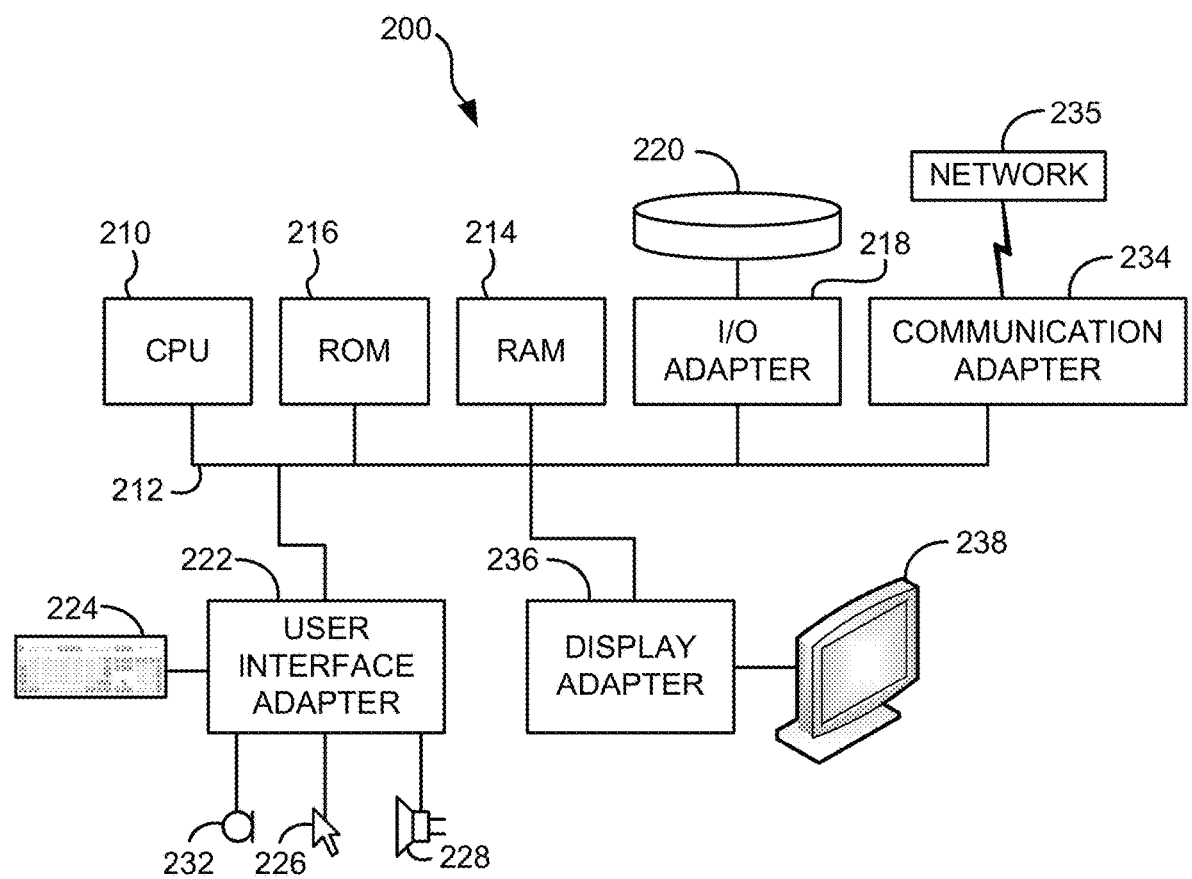
FIG. 2 shows a representative hardware environment that may be associated with the servers and/or clients of FIG. 1, in accordance with one approach.

FIG. 2 shows a representative hardware environment 200 associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

A user may have sufficient knowledge to navigate certain legs of a trip without navigational directions even though the user requested directions to an end destination. For example, a user is typically very familiar with the first few miles around their home and/or until they reach the highway, etc. A user may not know how to get to a certain town, but they may be familiar enough with the town once they get there to find their way to an end destination within said town.

For any of these known portions of the travel path, turn-by-turn navigational audio directions may be annoying, distracting, and/or dangerous. Navigational audio directions are often configured to interrupt any other audio output such as music, audio books, podcasts, phone conversations, etc. A conventional solution for bypassing interruptions includes manually disabling navigational directions and/or the navigation application. Manually disabling navigational directions and/or the navigation application typically includes a user physically interacting with a device while driving. Multi-tasking while driving is generally dangerous.

Disabling navigational directions and/or the navigation application may prevent the user from benefitting from other features of navigation applications. For example, a user may want to disable turn-by-turn navigational audio directions but still receive alerts regarding traffic, accidents, stalled cars, construction areas, potholes, weather, ice, and other hazards on the road which are provided by various navigation applications.

Minimizing interruptions of audio output by audio directions for known portions of a travel path without requiring the user to physically interact with the device, manually disable directions and/or the application, etc. would be beneficial. Users who begin a trip in a known area may not need directions immediately, but inputting directions while driving, once the user has left the known area, is often dangerous. Traveling would be safer if audio directions are automatically suppressed until the device leaves the known area and the user does not have to interact with the device in order to avoid interruptions.

Some of the inventive approaches disclosed herein describe a method for collecting a device's historical trip information including starting positions, ending positions, whether the user requested navigational directions to navigate to a destination for each trip, etc. In some approaches, machine learning and/or other cognitive processes (such as IBM Watson Machine Learning) use the information gathered to generate a heat map associated with roads traveled by the device, the frequency of travel, whether the user knows the travel paths, etc.

The term "waypoint" may be generally considered herein to refer to any point and/or series of points on a route including starting positions, ending positions, intermediary positions, intermediary destinations, end destinations, complete travel paths, at least a portion of a travel path, neighborhoods, streets, trails, landmarks, etc.

In one aspect, the navigation application and at least some of the operations of the present method may run substantially continuously with a user's permission. If the navigation application and at least some of the operations of the present method are running continuously, at least some of the operations of the method described are performed substantially constantly unless the user opts out of continuous travel data collection.

In one approach, if a user opts out of continuous travel data collection by the navigation application and at least some of the operations of the present method, the user may choose to initiate the operations of the method when initializing the navigation application, when the device is in a predetermined location, when the device is in a predetermined radius of a location, etc.

For example, a user may disable a background refresh setting in the navigation application and/or user device, but the user may set the navigation application to collect travel data whenever the user enters a "downtown" area that is not well known to the user. Other approaches are described in further detail below with reference to FIG. 4.

Figure 3:
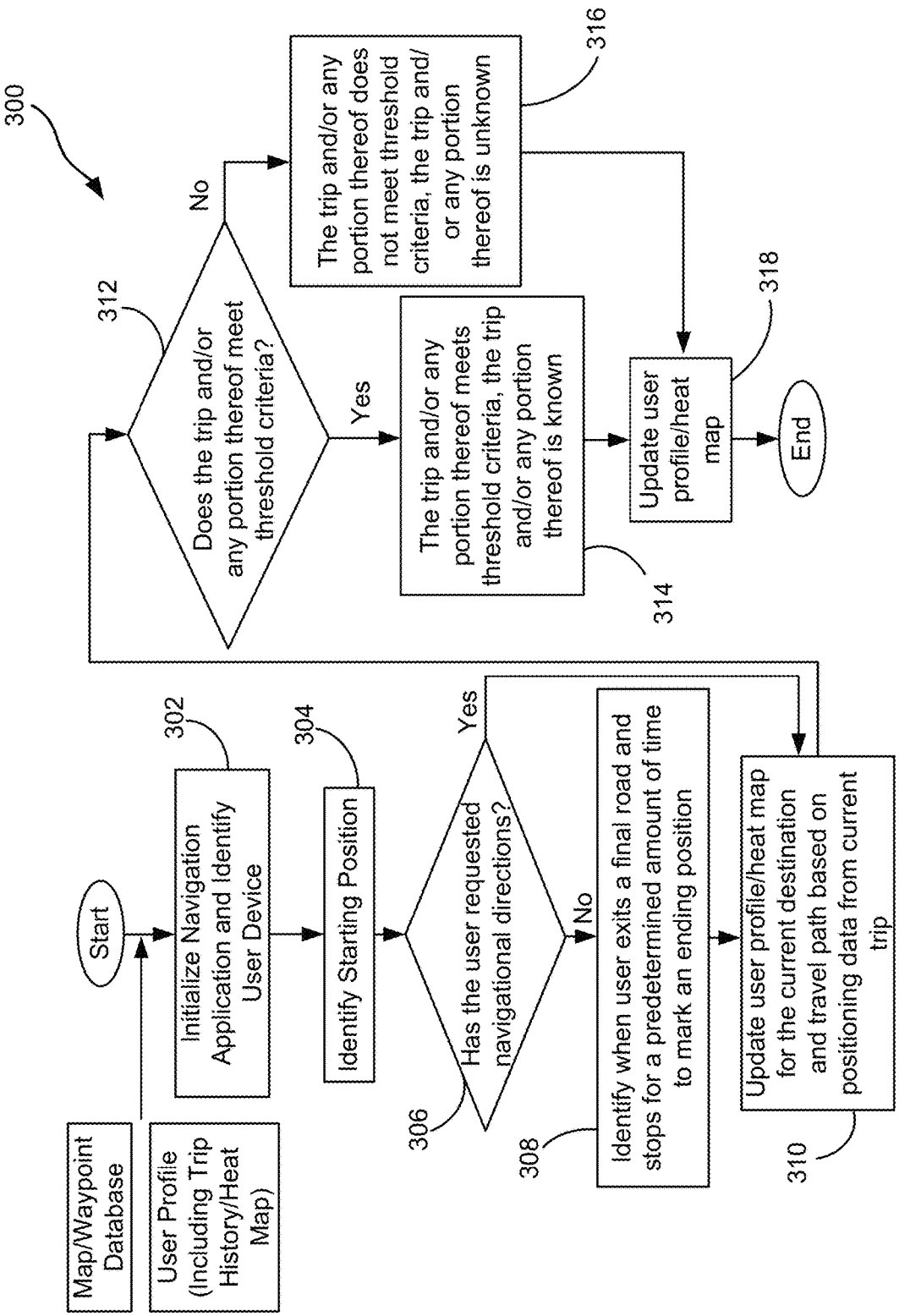
FIG. 3 is a flowchart of a method, in accordance with one approach.

Now referring to FIG. 3, a flowchart of a method 300 is shown according to one approach. The method 300 may be performed in accordance with the present invention in any of the environments depicted in FIGS. 1-2 and 4, among others, in various approaches. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various approaches, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where the method includes initializing a navigation application on a device. The navigation application may be any GPS application known in the art such as Apple Maps, Google Maps, Waze, Glympse, Locale, Where, Topo Maps, CoPilot GPS, NeverLate, etc. modified and/or running an applet/plugin to perform the method 300. The navigation application may receive input from and/or detect positions of the user device derived from information within a map/waypoint database. Any map/waypoint database which is known in the art including databases which may be built and/or updated by navigation applications, user input, social data, etc. may be used. Again, the inventive aspects disclosed herein are described in the context of GPS applications by way of example only and a person having ordinary skill in the art would appreciate that such inventive aspects may be implemented using any positioning system and/or data.

Operation 302 may comprise identifying a user device. In one approach, a user device may be a mobile device, a vehicle, a tablet, a vehicle-mounted GPS device, or any other user device with location-determining capabilities known in the art. In a preferred approach, the user device is a personal smart phone. A smart phone may allow the method 300 to confidently associate a user profile with a specific user and/or user device. Additionally, a personal smart phone may be readily capable of collecting accurate data of a user's travel routes regardless of the user's method of travel.

For example, a user's smart phone may be capable of building a user's profile for multiple types of directions. Types of directions may include driving directions, walking directions, biking directions, hiking directions, etc. In some examples, a smart phone may be more flexible for collecting travel data for multiple types of directions because a smart phone is more portable than other GPS devices (e.g. a motor vehicle typically would not be capable of collecting travel data for hiking directions).

In one approach, one or more user devices may be associated with a user profile and/or a corresponding heat map. For example, a user's smart phone and vehicle may have separate location-determining capabilities and both user devices may collect historical trip data with the user's permission. Data collected from the multiple devices may be used to update a user profile and/or associated heat map.

Operation 302 may include identifying the user device using a unique user mobile device identifier. The user mobile device identifier may be any mobile device identifier known in the art such as an IMEI, a MIN, a MSIN, a SIM, an IMSI, a device IP address, a MSISDN, etc.

Operation 304 of method 300 may include identifying a starting position of a device. The starting position of the device may be any waypoint. The starting position may be identified by user input, the current location of the device, a user labeled "home" address, a user labeled "work" address, a cognitively determined "home" address, a cognitively determined "work" address, etc.

A cognitively determined "home" and/or "work" address may be determined based on the frequency of the device's departures and/or arrivals from and/or to a private property and/or substantially the same location. Cognitively determining a "home" and/or "work" address may be done via IBM Watson Machine Learning, or any other technique known in the art.

In one approach, the starting position may be identified when the device leaves private property and enters a public roadway for a predetermined amount of time set by the user, the GPS application, social data, a default setting, etc.

Decision block 306 of method 300 may include an operation to determine whether the user requested navigational directions. If yes, the method 300 sets the destination of the device as the endpoint of the navigational directions. The method 300 identifies a travel path of the device based on the destination of the device and information derived from a map and/or waypoint database. The method 300 may identify a travel path in conjunction with a navigation application using any technique known in the art.

In one approach, the device outputs audio and/or graphical navigational directions. The navigational directions may be output via any technique known in the art. In one approach, the method 300 tracks whether or not the user has requested navigational directions in order to update the user profile and/or associated heat map as further discussed below.

If no, the method 300 identifies a destination of a device by determining when the device exits a final road and stops for a predetermined amount of time to mark an ending position. See operation 308. The predetermined amount of time may be set by the user, the navigational application, social data, etc. The ending position of the device may be used to identify the destination for the device.

In response to determining the destination of the device, the method 300 may update a user profile for the destination including the starting position of the device, the destination of the device, the roads actually traveled by the device, the roads traveled based on navigational directions, the travel path of the device, the date of the arrival at the destination, etc. See operation 310. In one approach, the method 300 updates the user profile to increment a number of trips to the destination. The method 300 may update the user profile at the beginning of the trip, at the end of the trip, at both the beginning and end of the trip, periodically throughout the trip, continuously throughout the trip, randomly throughout the trip, etc.

In one approach, a user may optionally disable at least one of the operations of method 300 if the user is not requesting directions. For example, a first user may wish to disable updating a user profile on a personal smart phone when a second user is driving. The second user may have different knowledge about the waypoint which should not be updated to the first user's profile. Another example may include disabling updating a user profile when the device is capable of directing itself (e.g., an autonomous vehicle) and knowledge implemented into the device should not be attached to a mostly passive driver (e.g., user) via the user profile and/or corresponding heat map.

In one approach, updating the user profile may comprise updating a heat map associated with the user profile using the information about the destination and/or the identified travel path. Updating a heat map associated with the user profile may include using historical trip information about the destination and/or the identified travel path to illustrate data associated with the device's travel paths. In one approach, updating the heat map may comprise adding the roads traveled along the travel path to the heat map. For example, the heat map may comprise a user's "known" areas where only roads traveled at least once by the user are depicted, and more preferably at least a number of times such as at least twice, at least 5 times, at least 10 times, etc.

In one approach, a visual representation generated from data in the heat map may be presented as a visual map. Moreover, the visual map may have a color gradient corresponding to the frequency of travel paths. For example, a highly traveled path may be displayed as a red road on the visual map and a never traveled or lightly traveled road may be displayed as a white or yellow path respectively. The color gradient on the visual map may be updated to reflect the frequency of travel along a travel path.

Decision block 312 of method 300 may include an operation which determines whether to update a user profile and/or an associated heat map based on whether the trip and/or any portion thereof meets any threshold criteria for marking the trip and/or any portion thereof as known. Determining whether to update a user profile may include determining which portions, if any, of the user profile should be updated. Determining whether to update a user profile may include determining how to update a user profile and/or any portion thereof. Updating a user profile may include marking a trip and/or any portion thereof as known or unknown. The trip and/or any portion thereof may include the travel path, the destination, any waypoints, at least a portion of the travel path, etc. For any of the disclosed approaches, a threshold period of time may be less than 6 months, less than 3 months, less than 1 month, less than 1 week, less than 3 days, less than 1 day, etc.

The method 300 may infer that the trip and/or any portion thereof is known if the trip and/or any portion thereof meets any threshold criteria. See operation 314. Alternatively, the method 300 may infer that the trip and/or any portion thereof is unknown if the trip and/or any portion thereof does not meet any threshold criteria. See operation 316. The method 300 may proceed to operation 318 from either operation 314 or operation 316.

Threshold criteria for marking the trip and/or any portion thereof as known may include a determination that the device has traveled along a travel path a threshold number of times. A travel path may be inferred to be known based on higher frequencies of travel along the same travel path. In some approaches, a high frequency of travel along a travel path in a threshold period of time may be used to update the user profile to mark the travel path as known.

In one approach, the operation of decision block 312 determines whether to update the user profile for a destination to mark the destination as known in response to determining that the number of trips to the destination exceeds a predefined threshold. The predefined threshold number of trips may be set by the navigation application, the modified navigation application, the plugin, by the user, cognitively (e.g. by the navigation application, the modified navigation application, the plugin, etc.) on a user-by-user basis, based on the average user's preferences, social data, a default setting, etc.

In a further approach, determining whether to update a user profile for the trip and/or any portion thereof may include considering a time-decay factor. A user may forget a waypoint that was once known if a substantial period has passed between a series of trips and/or since a most recent trip. The time-decay factor may depend on the amount of time which has passed since the device traveled to a particular waypoint. The amount of time may be a default value, set manually by the user, etc. In one approach, the method 300 may set the amount of time on a user-by-user basis based on how long between trips a user waits on average before requesting directions (e.g., to a once known destination), or other machine learning based methods to determine how well a specific user generally recalls directions to a location over time. In another approach, the method 300 may set the amount of time which is an average calculated based on other user profiles, other user preferences, the length of the trip involved, etc.

In another approach, determining whether to update a user profile may include determining that a waypoint is known based on identifying when a user manually disables navigational directions. For example, a waypoint may be known if a user manually disables navigational directions at a certain point, over a threshold number of trips that involve a certain area. A waypoint may be inferred to be known if the user manually disables navigational directions before reaching an end destination.

An illustrative example may include a user who requests GPS directions to a grocery store on two occasions. On the third and fourth occasions, the user manually disables the GPS directions four blocks away from the grocery store. The method may conclude that the grocery store and the four blocks leading up to it, are now known waypoints based on the user manually disabling directions within a certain radius of the grocery store and/or along a particular path to the grocery store a threshold number of times.

Operation 318 may include updating a user profile in response to determining that the trip and/or any portion thereof includes any threshold criteria for marking the trip and/or any portion thereof as known or unknown. It may be inferred that the user has memorized the waypoint if the waypoint is marked as known. It may be inferred that the user will not request directions the next time that the trip is repeated if the waypoint is marked as known.

In one approach, any threshold criteria for marking a trip and/or any portion thereof as known or unknown may be specific to the user. A user's memory capabilities may be self-reported. In a preferred approach, any threshold criteria for marking the trip and/or any portion thereof as known or unknown is determined cognitively based on at least some configurations of method 300.

In one approach, updating a user profile comprises marking the destination as known in response to determining that the number of trips to the destination exceeds a predefined threshold. The predefined threshold number of trips may be set by the navigation application, the modified navigation application, the plugin, by the user, cognitively (e.g., by the navigation application, the modified navigation application, the plugin, etc.) based on the average user's preferences, social data, a default setting, etc.

In another approach, operation 318 updates the user profile to unmark the destination as known in response to a determination that the device has not traveled to the destination in a predetermined period of time after the destination was last visited. The predetermined period of time may be set by the navigation application, the modified navigation application, the plugin, by the user, cognitively (e.g., by the navigation application, the modified navigation application, the plugin, etc.) on a user-by-user basis, based on the average user's preferences, social data, a default setting, etc.

In one approach, updating a user profile comprises marking the travel path as known in response to determining that the number of trips along the travel path exceeds a predefined threshold. The predefined threshold number of trips may be set by the navigation application, the modified navigation application, the plugin, by the user, cognitively (e.g. by the navigation application, the modified navigation application, the plugin, etc.) on a user-by-user basis, based on the average user's preferences, social data, a default setting, etc.

In another approach, operation 310 updates the user profile to unmark the travel path as known in response to a determination that the device has not traveled along the travel path in a predetermined period of time. The predetermined period of time may be set by the navigation application, the modified navigation application, the plugin, by the user, cognitively (e.g. by the navigation application, the modified navigation application, the plugin, etc.) on a user-by-user basis, based on the average user's preferences, social data, a default setting, etc.

In another approach, operation 310 updates the user profile to unmark the destination as known in response to a determination that the user made a wrong turn even with audio and/or graphical directions enabled. The method may infer that a user is not familiar with a travel path, waypoint, destination, etc. even though they have traveled there one or more times and/or the travel path, waypoint, destination, etc. was previously marked as known.

In yet another approach, updating the user profile comprises marking at least a portion of the travel path as known in response to determining that the device has not received instructions to provide travel directions for at least a portion of the travel path. In one configuration, at least a portion of the travel path may be marked as known in response to a user disabling the output of travel directions for the at least a portion of the travel path.

In various approaches, updating the user profile may comprise unmarking a waypoint as known interchangeably with marking a waypoint as unknown in response to determining that the trip meets or does not meet various thresholds as discussed above.

In one approach, updating a user profile may comprise adjusting confidence levels for marking a waypoint as known or unknown by the user. Adjusting confidence levels may include analyzing the confidence levels based on an increase in the sample size. Adjusting confidence levels may include considering a time-decay factor to determine whether it is likely that a destination is now unknown after a substantial period of time has passed since a previous trip to the destination. Confidence levels may correspond to whether a user has sufficient knowledge of a waypoint such that the user does not request navigational directions to the waypoint. Confidence levels may be adjusted for a first waypoint based on learned history from a second waypoint that was visited a similar number of times, then not visited for a duration or time. A threshold period of time for a user may be cognitively determined based on historical trip data and/or data derived therefrom.

For example, a first user may travel to a grocery store twice within a week. The user may still need directions to the grocery store when they travel there again a month later. A threshold period of time for this user may be cognitively set to one month, however the threshold period of time may be updated periodically, continuously, based on event triggers, etc. A second user may go to a location once and still remember how to get there again 6 months later with no directions. This user would have a much longer cognitively learned threshold period of time.

In one approach, updating the user profile for operation 310 may comprise updating a corresponding heat map. Updating a heat map associated with the user profile may include using historical travel path information to illustrate data associated with the device's travel path.

In one approach, the data used to update the heat map may also be used to update a visual map. Updating the visual map generated from data in the heat map may include changing a waypoint's color gradient to reflect that a device has traveled to the waypoint at least one time. In another approach, a color gradient of a heat map may be updated to reflect whether a device has traveled to the waypoint a threshold number of times. For example, updating the visual map may include adding color to a waypoint on the heat map where there was once no color because the device had never traveled to the waypoint. In another example, updating the visual map may include changing the color (e.g. from orange to red) of a waypoint on the visual map because the device has traveled to the waypoint a threshold number of times to consider the waypoint known rather than moderately traveled and/or moderately known.

An illustrative example of method 300 includes a user who has requested navigational directions to a grocery store three times in the past month. If the user has driven to the same grocery store two additional times since those previous three times without requesting directions, the user profile may be updated to mark the grocery store and/or the travel path to the grocery store as known. The user profile may be updated to include the date of arrival at the destination and increment the number of trips to the grocery store. The method may update the heat map to reflect the travel path traveled, the frequency of the travel path, etc. The color indication of the grocery store and/or the travel path on a visual map may be updated, e.g., from a yellow or orange color to a red color (or in any desirable visual and/or color scheme), in order to indicate that the grocery store and/or travel path is highly traveled and now known. The color indication of the grocery store and/or travel path on the visual map may be updated to indicate higher confidence levels such that the grocery store and/or travel path are well known to the user. If the grocery store and/or travel path is now marked as known, further approaches may suppress at least audible directions to the grocery store and/or along a travel path as discussed in further detail below in reference to FIG. 4.

Figure 4:
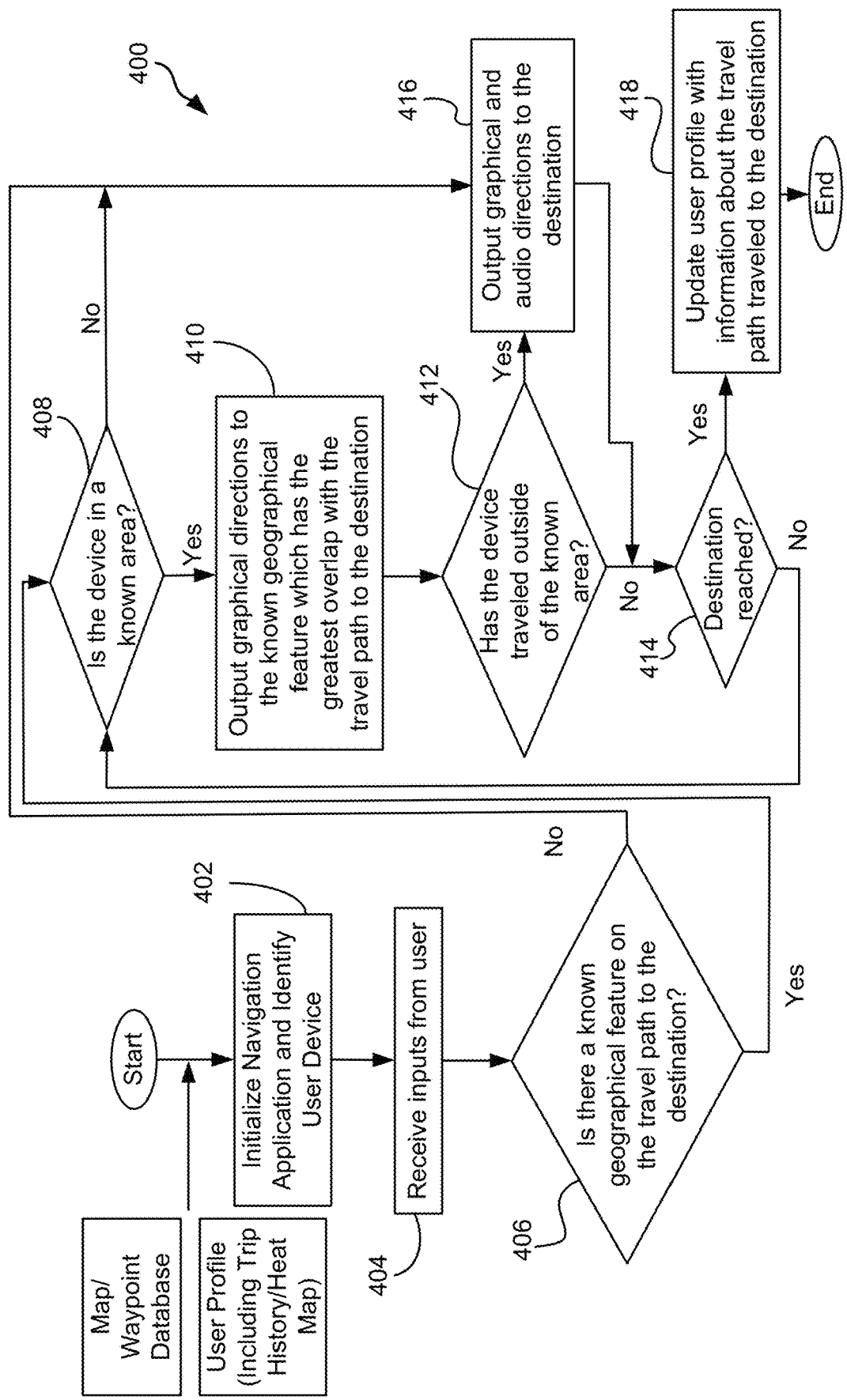
FIG. 4 is a flowchart of a method, in accordance with one approach.

Now referring to FIG. 4, a flowchart of a method 400 is shown according to one approach. The method 400 may be performed in accordance with the present invention in any of the environments depicted in FIGS. 1-3, among others, in various approaches. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where the method includes initializing a navigation application on a device. The navigation application may be any GPS application known in the art such as Apple Maps, Google Maps, Waze, Glympse, Locale, Where, Topo Maps, CoPilot GPS, NeverLate, etc. modified and/or running an applet/plugin to perform the method 400. The navigation application may receive input from and/or detect positions of the user device derived from information within a map/waypoint database. Any map/waypoint database which is known in the art including databases which may be built and/or updated by navigation applications, user input, social data, etc. may be used. Again, the inventive aspects disclosed herein are described in the context of GPS applications by way of example only and a person having ordinary skill in the art would appreciate that such inventive aspects may be implemented using any positioning system and/or data.

Operation 402 may comprise identifying a user device for assisting in performing additional operations of the method 400. For example, upon identifying the user device, the appropriate user profile may be accessed for further operations. Similarly, the user device may be effectively identified via a login from an application running on the device, an identifier sent by the device during initialization of method 400, or any other technique known in the art.

The user device may be a mobile device, a vehicle, a tablet, a vehicle-mounted GPS system, or any other user device with location-determining capabilities known in the art. In a preferred approach, the user device is a personal smart phone. A smart phone may allow the method 400 to confidently associate a user profile with a specific user and/or user device. Additionally, a smart phone may be readily capable of collecting accurate data of a user's travel routes regardless of the user's method of travel.

In one approach, a user's smart phone, tablet, etc. may be capable of building a user's profile for multiple types of directions. Types of directions may include driving directions, walking directions, biking directions, hiking directions, etc. In some examples, a smart phone may be more flexible for collecting travel data for multiple types of directions because a smart phone is more readily capable of transportation than other GPS devices (e.g. a motor vehicle typically would not be capable of collecting travel data for hiking directions).

In one approach, one or more user devices may be associated with a user profile and/or a corresponding heat map. For example, a user's smart phone and vehicle may have separate GPS capabilities and both user devices may collect historical trip data with the user's permission. Data collected from the multiple devices may be collected, e.g., by a remote server, and used to update a user profile and/or associated heat map.

Operation 402 may include identifying the user device using a unique user mobile device identifier. The user mobile device identifier may be any mobile device identifier known in the art such as an IMEI, a MIN, a MSIN, a SIM, an IMSI, a device IP address, a MSISDN, etc.

Operation 402 of method 400 may include identifying a starting position of a device. The starting position of the device may be any waypoint. The starting position may be identified by user input, the current location of the device, a user labeled "home" address, a user labeled "work" address, a cognitively determined "home" address, a cognitively determined "work" address, etc.

A cognitively determined "home" and/or "work" address may be determined based on the frequency of the device's departures and/or arrivals from and/or to a particular property and/or substantially the same location. Cognitively determining a "home" and/or "work" address may be done via IBM Watson Machine Learning, or any other technique known in the art.

In one approach, the starting position may be identified when the device leaves private property and enters a public roadway for a predetermined amount of time set by the user, the GPS application, social data, a default setting, etc.

Operation 404 of method 400 may include receiving inputs. Inputs may comprise a request for navigational directions to a destination, audio output preferences, graphical output preferences, etc. In one example, the inputs received include a desired destination, a request for navigational directions, and audio output preferences set to suppress directions for known portions of the travel path. In one approach, the user does not set audio and/or graphical output preferences and the method continues to decision block 406.

In one approach, the user may set audio output preferences to disable audio directions when the device in is a known area. In another approach, the device may output options to the user. Options may include a travel path which is the fastest travel path, a travel path which contains the most known areas, a travel path which travels less than all of the known areas which are on the travel path to the destination, etc. In a preferred approach, method 400 cognitively determines which travel path to output based on a user's past selections.

Decision block 406 of method 400 may include an operation for determining whether a travel path to a known geographical feature overlaps a portion of the travel path to the destination. In another approach, the operation determines whether a known geographical feature is located on a travel path to the destination, the known geographical feature being derived from a user profile. A known geographical feature may comprise any point and/or series of points on a route including starting positions, ending positions, intermediary positions, intermediary destinations, end destinations, complete travel paths, at least a portion of a travel path, neighborhoods, streets, trails, landmarks, etc. which are marked as known in a user profile and/or an associated heat map. A user profile may comprise known geographical features, individual user information, individual device information, user device identifier(s), heat maps, historical trip data including starting positions, ending positions, travel paths, requests for navigational directions, travel times, travel dates, driver (e.g., user) habits such as average speed, average speed compared to a speed limit, etc. In one configuration, the known geographical feature is selected from the group consisting of a road and a waypoint.

Determining whether a known geographical feature is located on a travel path that overlaps with a travel path to the destination may be computed locally on the device using the user profile stored on the device, via a cloud-based service, etc.

If yes, the method 400 proceeds to decision block 408. If no, the method 400 may, in response to determining that a known geographical feature is not located on the travel path to the destination, include outputting graphical and audio directions to the destination. See operation 416. Alternatively, any known geographical features near the travel path may be referenced in an updated set of directions, to direct the user to a known location while straying only slightly from the fastest path to their final destination, if desired based on user configured preferences.

In one configuration, decision block 406 may include selecting, from a plurality of known geographical features in the known area, the known geographical feature which is located on a travel path which has the greatest overlap with the travel path to the destination. In another approach, decision block 406 may include selecting, from a plurality of known geographical features in the known area, the known geographical feature which is furthest along the travel path to the destination. In some approaches, decision block 406 may present a user with an option to choose a travel path to a destination with the greatest overlap with a travel path to a known geographical feature or a travel path with a known geographical feature which is furthest along the travel path to the destination. In yet another approach, the selection may be determined based on predefined user preferences associated with the user profile. The known geographical feature which is furthest along the travel path to the destination is preferably in the known area.

In one approach, a user may know how to get to a destination that is farther away from the current location of the device than the desired destination. The method may include selecting a known geographical feature which is farther away from the device's current location than the destination. Audio directions may be enabled when the method detects that the travel path to the desired destination no longer overlaps with the travel path to the farther known geographical feature.

For example, a user may know several geographical features in a neighborhood (e.g. the known area) which is along a travel path to a final destination. The final destination may be north of the device's current location. The method 400 may select the known geographical feature which is furthest north in the neighborhood and direct the user to that known geographical feature instead of a known geographical feature also in the neighborhood, but which is to the east of the device's current location.

In response to determining that a known geographical feature is located on the travel path to the destination, a sub-method is performed which comprises determining whether the device is currently in a known area. Decision block 408 includes an operation to determine whether the device is in a known area as indicated by the user's heat map. A known area may be derived from a user profile and/or an associated heat map.

In one approach, in response to determining a travel path to a known geographical feature which has the greatest overlap with the travel path to the destination, the sub-method described above may be performed.

A known area may comprise destinations, roads, waypoints, neighborhoods, geographical areas, etc. which have been previously marked as known according to approaches discussed in reference to FIG. 3.

In one approach, determining whether the known geographical feature and/or the device are on the travel path and/or in the known area may include overlaying the travel path and a user's heat map to determine whether there is overlap.

In response to determining that the device is currently in a known area, the method 400 proceeds to operation 410. Operation 410 may comprise outputting graphical directions to the known geographical feature in response to determining that the device is currently in the known area, the known area being derived from the user profile. In this approach, audio directions to the known geographical feature are not output. Audio directions to the known geographical feature are not output during outputting of the graphical directions while the device is in a known area. Interruptions to audio outputs (e.g., audio outputs which are not audio directions) are minimized and/or eliminated when audio directions are not output while the device is in a known area. Moreover, as noted above, not outputting audio directions in known areas minimizes distractions that would otherwise be created by the audio directions.

In one approach, if the device is entering a known area, before audio directions are disabled, audio directions may provide instructions telling the user how to travel to or toward the known geographical feature.

Moreover, if the device is currently in a known area and the known geographical feature is located on the travel path to the destination, audio directions may be suppressed to the known geographical feature. Graphical directions may still be displayed on the user device. In some approaches, graphical directions may be suppressed to further minimize distractions and increase user safety. A user who knows the geographical feature may be able to navigate to the known geographical feature without audio directions which typically interrupt any other audio outputs.

In one approach, in response to determining that the device is not currently in the known area, the method proceeds to operation 416 which includes outputting graphical and audio directions to the known geographical feature. In this approach, graphical and audio directions may be output to direct the user toward the desired destination and/or toward a known geographical feature that overlaps with directions to the desired location. Graphical and audio directions may be output as long the device is in an unknown area.

Decision block 412 includes an operation which determines whether the device has traveled outside the known area. For example, a device may be traveling in a known area but wander into an unknown area and/or encounter the boundary of the known area. If the device has traveled outside the known area, the method 400 may output graphical and audio directions to the next known geographical feature and/or the destination in response to determining that the device has traveled outside of the known area. See operation 416.

In one approach, decision block 412 may include an operation for determining that the device has entered a second known area, and outputting graphical directions to a second known geographical feature in the second known area in response to determining that the device is in a second known area. Audio directions to the known geographical feature are not output during outputting of the graphical directions while the device is in the second known area. The known area may be derived from the user profile and/or associated heat map. Again, audio directions to a known geographical feature are not output during outputting of the graphical directions while the device is in a known area.

Decision block 414 includes an operation which determines whether the device has reached the destination. If yes, the method 400 proceeds to operation 418. If no, the method 400 loops back to decision block 408. The sub-method including determining whether the device is currently in a known area and outputting graphical and/or audio directions based on the determination, reiterates until the device reaches the destination, the user disables the navigation application, the device does not travel along the travel path to the destination for a predetermined amount of time, etc. The sub-method reiterates to determine whether the device has entered or exited a known area and cognitively disables/enables audio directions based on whether the device is currently in a known or unknown area.

In response to reaching the destination, operation 418 includes updating the user profile and/or associated heat map. Updating the user profile and/or associated heat map may include gathering information about the travel path traveled to the destination.

Operation 418 may include updating a user profile. Updating the user profile may include marking the trip and/or any portion thereof as known or unknown in response to determining that the trip and/or any portion thereof includes any threshold criteria for marking the trip and/or any portion thereof as known or unknown. For any of the disclosed approaches, a threshold period of time may be less than 6 months, less than 3 months, less than 1 month, less than 1 week, less than 3 days, less than 1 day, etc.

In one approach, updating a user profile comprises marking the destination as known in response to determining that the number of trips to the destination exceeds a predefined threshold. The predefined threshold number of trips may be set by the navigation application, the modified navigation application, the plugin, by the user, cognitively (e.g. by the navigation application, the modified navigation application, the plugin, etc.) on a user-by-user basis, based on the average user's preferences, social data, a default setting, etc.

In another approach, operation 418 updates the user profile to unmark the destination as known in response to a determination that the device has not traveled to the destination in a predetermined period of time after the destination was last visited. The predetermined period of time may be set by the navigation application, the modified navigation application, the plugin, by the user, cognitively (e.g. by the navigation application, the modified navigation application, the plugin, etc.) on a user-by-user basis, based on the average user's preferences, social data, a default setting, etc.

In another approach, operation 418 updates the user profile to unmark the destination as known in response to a determination that the user made a wrong turn even with audio and/or graphical directions enabled. The method may infer that a user is not familiar with a travel path, waypoint, destination, etc. even though they have traveled there one or more times and/or the travel path, waypoint, destination, etc. was previously marked as known.

In one approach, updating a user profile comprises marking the travel path as known in response to determining that the number of trips along the travel path exceeds a predefined threshold. The predefined threshold number of trips may be set by the navigation application, the modified navigation application, the plugin, by the user, cognitively (e.g. by the navigation application, the modified navigation application, the plugin, etc.) on a user-by-user basis, based on the average user's preferences, social data, a default setting, etc.

In one approach, the updating a user profile comprises marking the travel path as known in response to determining that the number of trips along the travel path exceeds a predefined threshold in a predefined threshold period of time. A threshold period of time may be less than 6 months, less than 3 months, less than 1 month, less than 1 week, less than 3 days, less than 1 day, etc. For example, if a user has not traveled along a travel path a threshold number of times within a threshold time (e.g., 5 times within the past 6 months), audio directions may be enabled.

In another approach, operation 418 updates the user profile to unmark the travel path as known in response to a determination that the device has not traveled along the travel path in a predetermined period of time The predetermined period of time may be set by the navigation application, the modified navigation application, the plugin, by the user, cognitively (e.g. by the navigation application, the modified navigation application, the plugin, etc.) on a user-by-user basis, based on the average user's preferences, social data, a default setting, etc.

In yet another approach, updating the user profile to mark at least a portion of the travel path as known in response to determining that the device has not received instructions to provide travel directions for the at least a portion of the travel path. In one configuration, at least a portion of the travel path may be marked as known in response to disabling the output of travel directions for the portion of the travel path.

In one approach, updating a user profile may comprise adjusting confidence levels for marking a waypoint as known or unknown by the user. Confidence levels may correspond to whether a user has sufficient knowledge of a waypoint such that the user does not request navigational directions to the waypoint.

In one approach, updating the user profile may comprise updating a corresponding heat map. Updating a heat map associated with the user profile may include using historical travel path information to illustrate data associated with the device's travel path.

In one approach, updating the heat map may include updating a visual map. Updating the visual map generated from data in the heat map may include changing a waypoint's color gradient to reflect that a device has traveled to the waypoint at least one time. In another approach, a color gradient of a heat map may be updated to reflect whether a device has traveled to the waypoint a threshold number of times. For example, updating the visual map may include adding color to a waypoint on the heat map where there was once no color because the device had never traveled to the waypoint. In another example, updating the visual map may include changing the color (e.g., from orange to red) of a waypoint on the visual map because the device has traveled to the waypoint a threshold number of times to consider the waypoint known rather than moderately traveled and/or moderately known.

In various approaches, updating the user profile may comprise unmarking a waypoint as known interchangeably with marking a waypoint as unknown in response to determining that the trip meets or does not meet various thresholds as discussed above.

An illustrative example may include a device which begins a trip in a known area. When a user requests GPS directions to a destination to the west and outside of the known area, audio and/or graphical directions may be output to a known grocery store (e.g., a known geographical feature) which is on the western border of the known area. Audio directions are not output as long as the device remains in the known area. Once the device reaches the known grocery store and/or a predetermined radius surrounding the grocery store, audio directions may be enabled to direct the device and/or user through the remaining unknown area to the destination. The user profile and/or associated heat map may be updated for the given destination and/or travel path.

Another illustrative example may include a device traveling along a travel path with several known areas. The device may similarly begin the trip in a known area. If the device does not begin the trip in a known area, audio and/or graphical directions may direct the user and/or device to a known area. The destination may be in a known area but there may be one or more unknown areas along the travel path. In this example, a user may be traveling from their home in a first town which is known, to a friend's home in a second town to the west of the first town, which are both known. However, the user may be unfamiliar with the travel path between the towns. When the user requests directions to the friend's home, graphical directions may direct the user and/or device to a grocery store (e.g., a known geographical feature) which is on the western border of the known first town. Turn-by-turn audio directions are suppressed as long as the device remains in the first known town. As the device approaches the grocery store, turn-by-turn audio directions are enabled to direct the user and/or device through the unknown portion of the travel path between the first town and the second town. In response to the device entering the second known town, audio directions are not output as long as the device remains in the known area. Once the device reaches the friend's home, the user profile and/or associated heat map may be updated for the given destination and/or travel path.

In other approaches, it will be understood by one having ordinary skill in the art that the inventive aspects as described herein may be implemented for a variety of travel methods, locations, etc. For example, a user device may gather historical trip information from trips along hiking trails in a national park to update a user profile and/or associated heat map corresponding to a trail map of the park. In another example, the inventive aspects may be implemented into a device to gather information and/or in order to provide walking directions, biking directions, climbing directions, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   initialize a navigation application on a device;
   determine a current location of the device;
   receive a destination;
   determine whether a known geographical feature is located on a travel path to the destination, the known geographical feature being derived from a user profile, wherein the initialization is triggered in response to the device being in a predetermined radius of a predetermined location;
   in response to determining that a known geographical feature is not located on the travel path to the destination, outputting graphical and audio directions to the destination; and
   in response to determining that a known geographical feature is located on the travel path to the destination, performing a sub-method comprising:
      determining whether the device is currently in a known area; and
      outputting graphical and audio directions to the known geographical feature in response to determining that the device is not currently in the known area.

2. The computer-implemented method of claim 1, comprising, in response to determining that a known geographical feature is located on the travel path to the destination,
 determining whether the device is currently in a known area; and
 outputting graphical directions to the known geographical feature in response to determining that the device is currently in the known area, the known area being derived from the user profile, wherein audio directions to the known geographical feature are not output, wherein audio alerts are output in response to determining that the device is currently in the know area, the audio alerts being selected from the group consisting of: traffic, accidents, stalled cars, construction areas, potholes, weather, and ice.

3. The computer-implemented method of claim 1, wherein the known geographical feature is selected from the group consisting of a road and a waypoint, wherein the known geographical feature is cognitively determined based at least in part on a frequency of departures and/or arrivals from and/to substantially the same location.

4. The computer-implemented method of claim 1, comprising outputting graphical and audio directions in response to determining that the device has traveled outside of the known area.

5. The computer-implemented method of claim 1, comprising selecting, from a plurality of known geographical features in the known area, the known geographical feature which has the greatest overlap with the travel path to the destination.

6. The computer-implemented method of claim 1, comprising determining that the device has entered a second known area, and outputting graphical directions to a second known geographical feature in the second known area in response to determining that the device is currently in the second known area, wherein audio directions to the known geographical feature are not output during outputting of the graphical directions while the device is in the second known area.

7. The computer-implemented method of claim 1, comprising gathering information about the travel path traveled to the destination for updating the user profile, wherein the travel path is a type of path selected from the group consisting of: driving directions, walking directions, biking directions, and hiking directions.

8. The computer-implemented method of claim 1, wherein determining whether the known geographical feature is located on the travel path to the destination includes determining whether a travel path to the known geographical feature overlaps a portion of the travel path to the destination.

9. The computer-implemented method of claim 1, wherein a starting position for the travel path is identified based at least in part on determining that the device has left private property and enters a public roadway for a predetermined amount of time.

10. A computer program product for controlling audio output of a navigation application, the computer program product comprising a computer readable storage medium having program instructions embodied therewith, wherein the computer readable storage medium is not a transitory signal per se, the program instructions executable by a computer to cause the computer to perform a method comprising:
 initializing, by the computer, a navigation application on a device, wherein the initialization is triggered in response to the device being in a predetermined radius of a predetermined location;
 determining, by the computer, a current location of the device;
 receiving, by the computer, a destination;
 determining, by the computer, whether a known geographical feature is located on a travel path to the destination, the known geographical feature being derived from a user profile;
 in response to determining that a known geographical feature is not located on the travel path to the destination, outputting, by the computer, graphical and audio directions to the destination; and
 in response to determining that a known geographical feature is located on the travel path to the destination, performing, by the computer, a sub-method comprising:
 determining, by the computer, whether the device is currently in a known area; and
 outputting, by the computer, graphical and audio directions to the known geographical feature in response to determining that the device is not currently in the known area.

11. The computer program product of claim 10, wherein the known geographical feature is selected from the group consisting of a road and a waypoint.

12. The computer program product of claim 10, comprising program instructions executable by the computer to cause the computer to output graphical and audio directions in response to determining that the device has traveled outside of the known area.

13. The computer program product of claim 10, comprising program instructions executable by the computer to cause the computer to select, from a plurality of known geographical features in the known area, the known geographical feature which has the greatest overlap with the travel path to the destination.

14. The computer program product of claim 10, comprising program instructions executable by the computer to cause the computer to determine that the device has entered a second known area, and outputting graphical directions to a second known geographical feature in the second known area in response to determining that the device is currently in the second known area, wherein audio directions to the known geographical feature are not output during outputting of the graphical directions while the device is in the second known area.

15. The computer program product of claim 10, comprising program instructions executable by the computer to cause the computer to gather information about the travel path traveled to the destination for updating the user profile.

16. The computer program product of claim 10, wherein the known geographical feature is determined based at least in part on identifying whether a user manually disables navigational directions to the known geographical feature prior to arrival greater than a threshold number of times.

17. The computer program product of claim 10, wherein a starting position for the travel path is identified based at least in part on determining that the device has left private property and enters a public roadway for a predetermined amount of time.

18. The computer program product of claim 10, wherein the travel path is a type of path selected from the group consisting of: driving directions, walking directions, biking directions, and hiking directions.

19. The computer program product of claim 10, wherein determining whether the known geographical feature is located on the travel path to the destination includes determining whether a travel path to the known geographical feature overlaps a portion of the travel path to the destination.

20. A system, comprising:
    a processing circuit; and
    logic integrated with the processing circuit, executable by the processing circuit, or integrated with and executable by the processing circuit, the logic being configured to cause the processing circuit to:
    initialize, by the processing circuit, a navigation application on a device, wherein the initialization is triggered in response to the device being in a predetermined radius of a predetermined location;
    determine, by the processing circuit, a current location of the device;
    receive, by the processing circuit, a destination;
    determine, by the processing circuit, whether a known geographical feature is located on a travel path to the destination, the known geographical feature being derived from a user profile, wherein determining whether the known geographical feature is located on the travel path to the destination includes determining whether a travel path to the known geographical feature overlaps a portion of the travel path to the destination;
    in response to determining that a known geographical feature is not located on the travel path to the destination, output, by the processing circuit, graphical and audio directions to the destination; and
    in response to determining that a known geographical feature is located on the travel path to the destination, perform, by the processing circuit, a sub-method comprising:
        determining, by the processing circuit, whether the device is currently in a known area; and
        outputting, by the processing circuit, graphical and audio directions to the known geographical feature in response to determining that the device is not currently in the known area.

* * * * *